May 10, 1949.                G. R. ASCHAUER                2,469,588
SEAL
Filed March 16, 1946
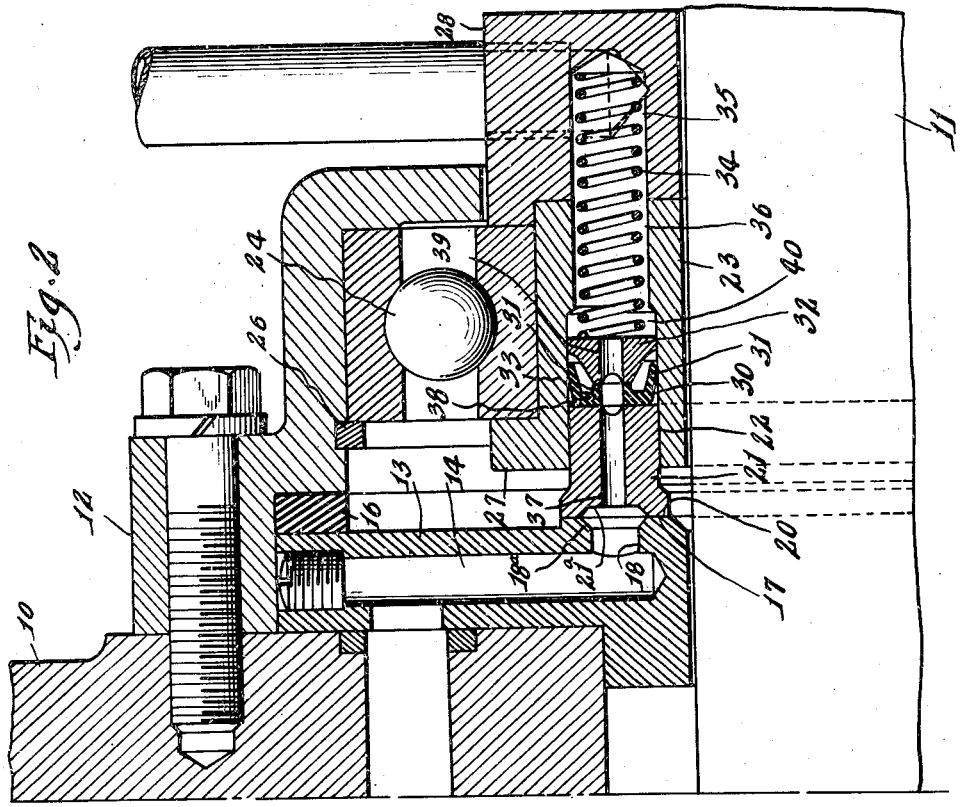
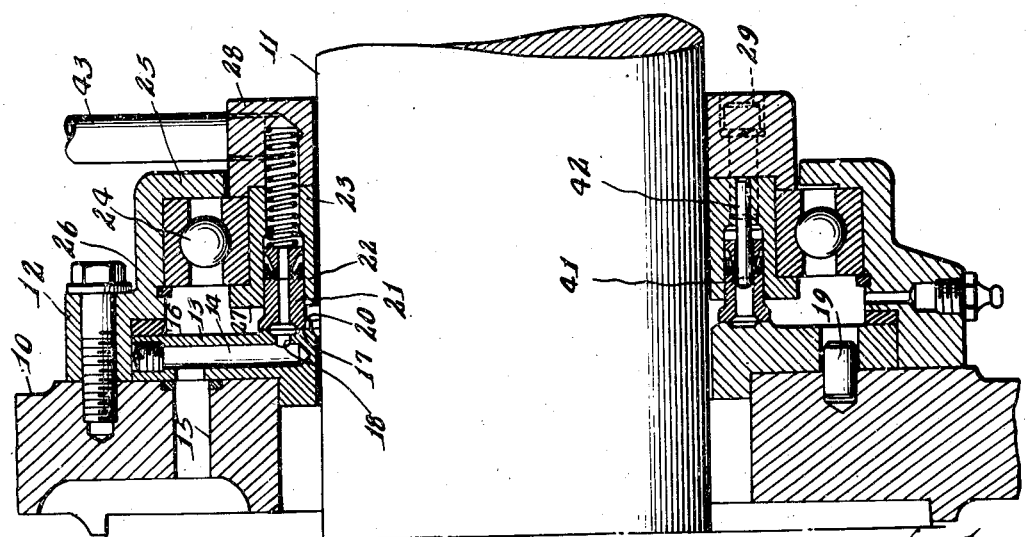
Inventor:-
George R. Aschauer
By
Attorney.

Patented May 10, 1949

2,469,588

UNITED STATES PATENT OFFICE 2,469,588

SEAL

George R. Aschauer, Racine, Wis., assignor to Twin Disc Clutch Company, Racine, Wis., a corporation of Wisconsin Application March 16, 1946, Serial No. 654,897

12 Claims. (Cl. 285—97.1)

My invention relates to seals and more particularly to an annular arrangement which accommodates the sealed flow therethrough of a fluid medium.

The present seal is of the around-the-shaft type and is primarily intended for use with air operated clutches as a means of communication between the source of air pressure and the rotary cylinder forming part of the actuating means of the clutch. A characteristic method of accomplishing this result is to supply air to the cylinder through an axial passage in the driven shaft. This arrangement not only requires the drilling of a hole through the shaft, but also the use of a collector air seal around the shaft at its end and may increase the overall length of the clutch.

It is therefore one object of my invention to devise a seal for the purpose indicated which eliminates the necessity for passages through the shaft and is so related to the clutch proper that air may be admitted directly through the seal into the clutch cylinder.

A further object is to provide a seal of the above type having stationary and rotary components in which provision is made for insuring a true sealing contact between the mating surfaces of the components.

These and further objects of the invention will be set forth in the following specification, reference being had to the accompanying drawing, and the novel means by which said objects are effectuated, will be definitely pointed out in the claims.

In the drawing:

Fig. 1 is a sectional elevation of the improved seal shown in working relation to an air operated clutch.

Fig. 2 is an enlarged, fragmentary, sectional view of the seal shown in Fig. 1.

Referring to the drawing, the numeral 10 designates a rotary wall forming part of an air operated clutch, for example, which wall may be a portion of the external member of the clutch that has driving relation with a plurality of friction plates (not shown), these plates in turn being operably related to similar plates (not shown) drivably connected to a driven shaft 11. Since the construction of such clutches is well known, the details thereof are not otherwise illustrated.

A retaining ring 12 is secured to the wall 10 in coaxial relation to the shaft 11 and serves to hold in abutting relation to the wall a ring 13 having a plurality of radial passages 14, only one of which is shown in the drawings and each of whose outer ends communicates with a passage 15 in the wall 10 leading to an air cylinder (not shown) forming part of the actuating mechanism of the clutch. Interposed between the ring 12 and the outer portion of the ring 13 is a cushion ring 16 that may be made of rubber, the clamping of the ring 13 being effected through the cushion ring for a purpose presently explained. The inner portion of the ring 13 is provided with an annular sealing face 17 which is transversely related with respect to the shaft and at which one end of a longitudinal passage 18 terminates, the other end communicating with the inner end of the radial passage 14, while the face 17 is recessed to form an annular groove 18ª which communicates with the passage 18. The ring 13 rotates with the wall 10 through the medium of pins 19 and constitutes the rotary component of the seal.

Sealably cooperating with the face 17 is a face 20 formed on the end of a carbon sealing ring 21 which is concentric with the shaft 11 and slidable in an annular channel 22 provided in a ring 23 that encircles and is slightly spaced from the shaft, the channel 22 only extending part way through the ring 23. The ring 21 includes an annular groove 21ª recessed in the face 21 in mating and cooperating relation with the groove 18ª. Seated on the outer periphery of the ring 23 is the inner race of a ball bearing 24 whose outer race fits within and provides journal support for the ring 12. The bearing is held in position by a flange 25 provided on the ring 12, a split ring 26 recessed in the ring 12, an annular shoulder 27 formed on the ring 23 and a ring 28 which is secured to the ring 23 by screws 29. The rings 23 and 28 are held against rotary movement by any approved means.

An annular, channel-section, sealing ring 30, preferably composed of rubber, sealingly abuts its web against the end face of the sealing ring 21 which is positioned within the channel 22, the wings 31 of the ring 30 having sealing contact with the walls of the channel. Also slidably mounted in the channel 22 is a follower ring 32 whose sectional shape is generally that of a truncated cone whose smaller end projects between the wings 31 into sealing contact with a plurality of bosses 33 formed on and equispaced around the web of the ring 30. The abutting relation of the rings 21, 30 and 32 and the contact of the faces 17 and 20 are maintained by a plurality of helical springs 34 equispaced around the shaft 11, only one of which is shown in the drawing. One end of each spring abuts the end of a pocket 35 provided in the ring 28 and which registers with a hole 36 in the ring 23 that connects with the channel 22, the other end of the spring extending through the hole and engaging the follower ring 32.

Aligned passages 37, 38 and 39 are provided, respectively, in the rings 21, 30 and 32, thus establishing communication between the passage 18 and an annular chamber 40 defined by the spacing of the follower ring 32 from the inner end of the channel 22. It will be understood that a plurality of groups of such aligned passages are spaced around the respective rings and the alignments are maintained by a suitable number of pins 41 (see Fig. 1) in selected groups of the passages, leaving the others free for the admission of air to the passages 14, the pins extending through holes 42 in the ring 23. Air under pressure is supplied through a hose 43 which connects with the pocket 35. The rings 21, 30 and 32 collectively constitute the stationary component of the improved seal, since the rings 23 and 28 are held against rotary movement.

The foregoing construction provides a simple and convenient method of supplying a fluid medium through the rotating wall of a piece of apparatus, such as an air operated clutch, with a shaft of the apparatus extending through the wall. The stationary component of the seal provides a journal support while the interposing of the rubber ring 16 which is compressed between the rings 12 and 13 prevents distortion of the latter ring and so insures the maintenance of the correct sealing relation between the faces 17 and 20.

As noted, the carbon sealing ring 21 with its passages 37 is made in one piece which simplifies and cheapens the assembly, develops less heat and enables pressure on the ring to be balanced. Further, the sealing ring 30 possesses certain novel attributes in that the provision of the bosses 33 imparts rigidity to this member while enabling the wings 31 to be made relatively thin and thus insure their freedom of action in maintaining sealing contact with the wall of the channel 22.

I claim:

1. An annular seal for supplying fluid to a rotating member comprising rotating and stationary components, the rotating component being constituted by a ring connected to the member for rotation therewith and having an annular sealing face and a passage leading from the face to the member, means for clamping the ring against the member, and the stationary component comprising ring means having an annular channel in opposite relation to the face, a sealing ring slidable in the channel and spring actuated to bear against the face and having a passage communicating with the first named passage, means for maintaining registration of the passages, and a conduit providing communication between the last named passage and a fluid source.

2. An annular seal for supplying fluid to a rotating member comprising rotating and stationary components, the rotating component being constituted by a ring connected to the member for rotation therewith and having an annular sealing face and a passage leading from the face to the member, means for clamping the ring against the member, and the stationary component comprising ring means having an annular channel in opposite relation to the face, a sealing ring slidable in the channel and spring actuated to bear against the face and having a passage communicating with the first named passage, means for maintaining registration of the passages, a conduit providing communication between the last named passage and a fluid source, and a bearing carried by the ring means to provide journal support for the clamping means.

3. An annular seal for supplying fluid to a rotating member comprising rotating and stationary components, the rotating component being constituted by a ring connected to the member for rotation therewith and having an annular sealing face and a passage leading from the face to the member, means for clamping the ring against the member, cushion means interposed between the ring and clamping means, and the stationary component comprising ring means having an annular channel in opposite relation to the face, a sealing ring slidable in the channel and spring actuated to bear against the face and having a passage communicating with the first named passage, means for maintaining registration of the passages, and a conduit providing communication between the last named passage and a fluid source.

4. An annular seal for supplying fluid to a rotating member comprising rotating and stationary components, the rotating component being constituted by a ring pinned to the member for rotation therewith and having an annular sealing face located inwardly of the ring and a passage leading generally radially outward from the face to the member, means for clamping the outer portion of the ring against the member, cushion means interposed between the ring and clamping means outwardly of the face, and the stationary component comprising ring means having an annular channel in opposite relation to the face, a sealing ring slidable in the channel and spring actuated to bear against the face and having a passage communicating with the first named passage, means for maintaining registration of the passages, and a conduit providing communication between the last named passage and a fluid source.

5. An annular seal for supplying fluid to a rotating member comprising rotating and stationary components, the rotating component being constituted by a ring pinned to the member for rotation therewith and having an annular sealing face located inwardly of the ring and a passage leading generally radially outward from the face to the member, means for clamping the outer portion of the ring against the member, a rubber ring interposed between the ring and clamping means outwardly of the face, and the stationary component comprising ring means having an annular channel in opposite relation to the face, a sealing ring slidable in the channel and spring actuated to bear against the face and having a passage communicating with the first named passage, means for maintaining registration of the passages, and a conduit providing communication between the last named passage and a fluid source.

6. An annular seal for supplying fluid to a rotating member comprising rotating and stationary components, the rotating component being constituted by a ring connected to the member for rotation therewith and having an annular sealing face and a passage leading from the face to the member, means for clamping the ring against the member, and the stationary component comprising ring means having an annular channel in opposite relation to the face, a unitary sealing ring slidable in the channel and spring actuated to bear against the face, the sealing ring having a passage therethrough terminating in an annular groove cooperably related to the first named passage whereby both passages are always in communication, and a conduit providing communication between the last named passage and a fluid source.

7. An annular seal for supplying fluid to a rotating member comprising rotating and stationary components, the rotating component being constituted by a ring connected to the member for rotation therewith and having an annular sealing face and a passage leading from the face to the member, means for clamping the ring against the member, cushion means interposed between the ring and clamping means, and the stationary component comprising ring means having an annular channel in opposite relation to the face, a sealing ring slidable in the channel and spring actuated to bear against the face and having a passage communicating with the first named passage, and a conduit providing communication between the last named passage and a fluid source.

8. An annular seal for supplying fluid to a rotating member comprising rotating and stationary components, the rotating component being constituted by a ring connected to the member for rotation therewith and having an annular sealing face and a passage leading from the face to the member, means for clamping the ring against the member, cushion means interposed between the ring and clamping means, and the stationary component comprising ring means having an annular channel in opposite relation to the face, a unitary sealing ring slidable in the channel and spring actuated to bear against the face, the sealing ring having a passage therethrough terminating in an annular groove cooperably related to the first named passage whereby both passages are always in communication, and a conduit providing communication between the last named passage and a fluid source.

9. An annular seal for supplying fluid to a rotating member comprising rotating and stationary components, the rotating component being constituted by a ring connected to the member for rotation therewith and having an annular sealing face and a passage leading from the face to the member, means for clamping the ring against the member, and the stationary component comprising ring means having an annular channel in opposite relation to the face, a sealing ring slidable in the channel and having a passage providing communication between the first named passage and channel, a conduit in the stationary component for supplying fluid to the channel, spring actuated means constantly urging the sealing ring against the face, and means interposed between the sealing ring and spring actuated means for providing a seal with the annular walls of the channel comprising a channel section, elastic ring having its web abuttting the adjacent end face of the sealing ring and its wings resiliently and sealingly contacting the annular walls of the channel, the web being apertured in registration with the sealing ring passage.

10. An annular seal for supplying fluid to a rotating member comprising rotating and stationary components, the rotating component being constituted by a ring connected to the member for rotation therewith and having an annular sealing face and a passage leading from the face to the member, means for clamping the ring against the member, and the stationary component comprising ring means having an annular channel in opposite relation to the face, a sealing ring slidable in the channel and having a passage providing communication between the first named passage and channel, a conduit in the stationary component for supplying fluid to the channel, a plurality of spring actuated means spaced around the stationary component and constantly urging the sealing ring against the face, and means interposed between the sealing ring and spring actuated means for providing a seal with the annular walls of the channel comprising a channel section, elastic ring having its web abutting the adjacent end face of the sealing ring and its wings resiliently and sealingly contacting the annular walls, the web being apertured in registration with the sealing ring passage and thickened at the points of contact with the spring actuated means, the wings being thin relative to the thickened portions of the web.

11. In an annular seal comprising rotating and stationary components for supplying fluid to a rotating member and including an annular channel in the stationary component, an annular sealing ring slidable in the channel for coaction with a sealing face on the rotating component and having a passage extending therethrough for conducting fluid admitted to the channel, spring actuated means constantly urging the sealing ring against the face, and means interposed between the sealing ring and spring actuated means for providing a seal with the annular walls of the channel comprising a channel section, elastic ring having its web abutting the adjacent end face of the sealing ring and its wings resiliently and sealingly contacting the annular walls of the channel, the web being apertured in registration with the sealing ring passage.

12. In an annular seal comprising rotating and stationary components for supplying fluid to a rotating member and including an annular channel in the stationary component, an annular sealing ring slidable in the channel for coaction with a sealing face on the rotating component and having a passage extending therethrough for conducting fluid admitted to the channel, a plurality of spring actuated means spaced around the stationary component and constantly urging the sealing ring against the face, and means interposed between the sealing ring and spring actuated means for providing a seal with the annular walls of the channel comprising a channel section, elastic ring having its web abutting the adjacent end face of the sealing ring and its wings resiliently and sealingly contacting the annular walls, the web being apertured in registration with the sealing ring passage and thickened at the points of contact with the spring actuated means, the wings being thin relative to the thickened portions of the web.

GEORGE R. ASCHAUER.

REFERENCES CITED

The following references are of record in the file of this patent:

UNITED STATES PATENTS

| Number | Name | Date |
|---|---|---|
| 1,876,515 | Emmet | Sept. 6, 1932 |
| 2,183,761 | Aspinwall | Dec. 19, 1939 |
| 2,404,494 | Halby | July 23, 1946 |